US011313590B2

(12) United States Patent
Nadai et al.

(10) Patent No.: US 11,313,590 B2
(45) Date of Patent: *Apr. 26, 2022

(54) ENERGY EFFICIENT WATER HEATER

(71) Applicants: Sandbar Technologies LLC, Columbus, OH (US); Sherry Nadai

(72) Inventors: Kevin Patrick Nadai, Niles, MI (US); Kent Elwood Ross, South Bend, IN (US); Edward Leroy Tribble, II, South Bend, IN (US)

(73) Assignee: Sandbar Technologies, LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,907

(22) Filed: Nov. 24, 2020

(65) Prior Publication Data
US 2021/0080149 A1 Mar. 18, 2021

Related U.S. Application Data

(63) Continuation of application No. 16/105,273, filed on Aug. 20, 2018, now Pat. No. 10,876,767.

(51) Int. Cl.
F24H 9/20 (2006.01)
F24H 1/12 (2022.01)
F16K 17/38 (2006.01)
F24H 9/1836 (2022.01)
F24H 9/12 (2022.01)

(52) U.S. Cl.
CPC ........... F24H 9/2035 (2013.01); F16K 17/38 (2013.01); F24H 1/125 (2013.01); F24H 9/128 (2013.01); F24H 9/1836 (2013.01)

(58) Field of Classification Search
CPC . F24D 19/1051; F24D 2200/04; F24H 9/2035
See application file for complete search history.

(56) References Cited

U.S. PATENT DOCUMENTS 5,322,216 A * 6/1994 Wolter ............... G05D 23/1931
236/25 R
RE37,745 E * 6/2002 Brandt .................... F24H 1/205
122/14.2

(Continued)

FOREIGN PATENT DOCUMENTS

JP 60069452 4/1985

Primary Examiner — Gregory A Wilson
(74) Attorney, Agent, or Firm — Tyler Dunham, Esq.

(57) ABSTRACT

Apparatuses of an energy efficient water heater and methods for controlling the same are disclosed. In one embodiment, a water heater may include a water inlet configured to receive input water, an input water temperature sensor configured to detect a temperature of the input water, a user interface unit configured to receive an output water temperature setting selected by a user, a controller configured to determine a flow rate of an output water based on the input water temperature and the output water temperature setting, a heating unit configured to heat the input water to produce the output water, the controller is further configured to control the heating unit and a proportional flow restrictor to produce the flow rate of the output water, and a water outlet configured to transfer the output water at the flow rate of the output water.

16 Claims, 10 Drawing Sheets

(56) References Cited

U.S. PATENT DOCUMENTS

| | | | | |
|---|---|---|---|---|
| 7,142,107 | B2* | 11/2006 | Kates | H04Q 9/00 |
| | | | | 340/539.1 |
| 8,028,355 | B2* | 10/2011 | Reeder | A46B 15/0055 |
| | | | | 4/623 |
| 8,971,694 | B2* | 3/2015 | Deivasigamani | G06F 16/9574 |
| | | | | 392/308 |
| 9,063,551 | B2* | 6/2015 | Deivasigamani | G05D 7/0629 |
| 9,158,312 | B2* | 10/2015 | Huang | F24H 9/2035 |
| 9,213,998 | B2* | 12/2015 | Besore | G01K 17/08 |
| 10,605,486 | B2* | 3/2020 | Chaudhry | F24H 1/22 |
| 2009/0234513 | A1* | 9/2009 | Wiggins | F24D 19/1051 |
| | | | | 700/300 |
| 2012/0054123 | A1* | 3/2012 | Broniak | G06Q 50/06 |
| | | | | 705/412 |
| 2017/0325294 | A1* | 11/2017 | Kim | H05B 6/06 |
| 2019/0003741 | A1* | 1/2019 | van Houten | G01F 1/6965 |

* cited by examiner

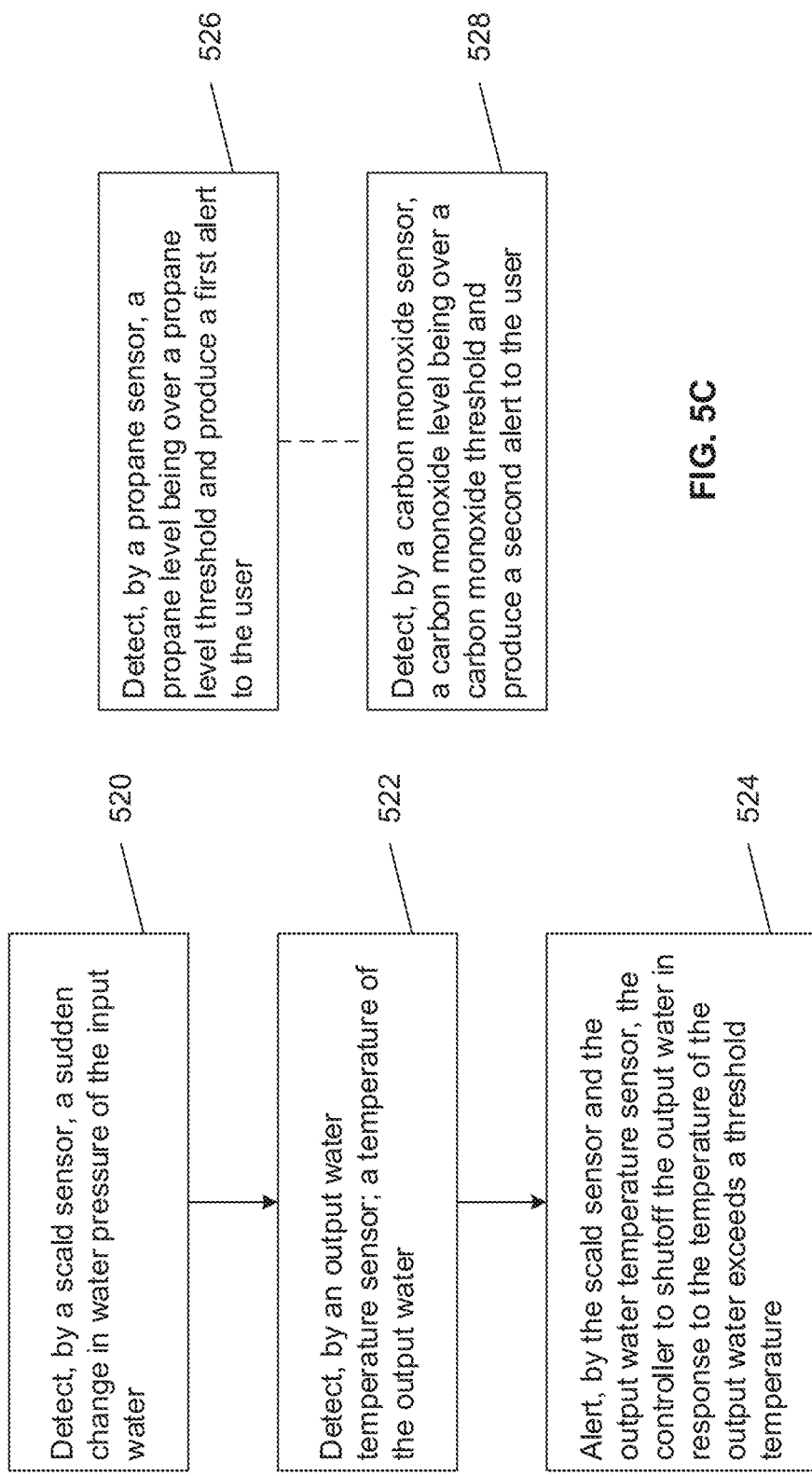

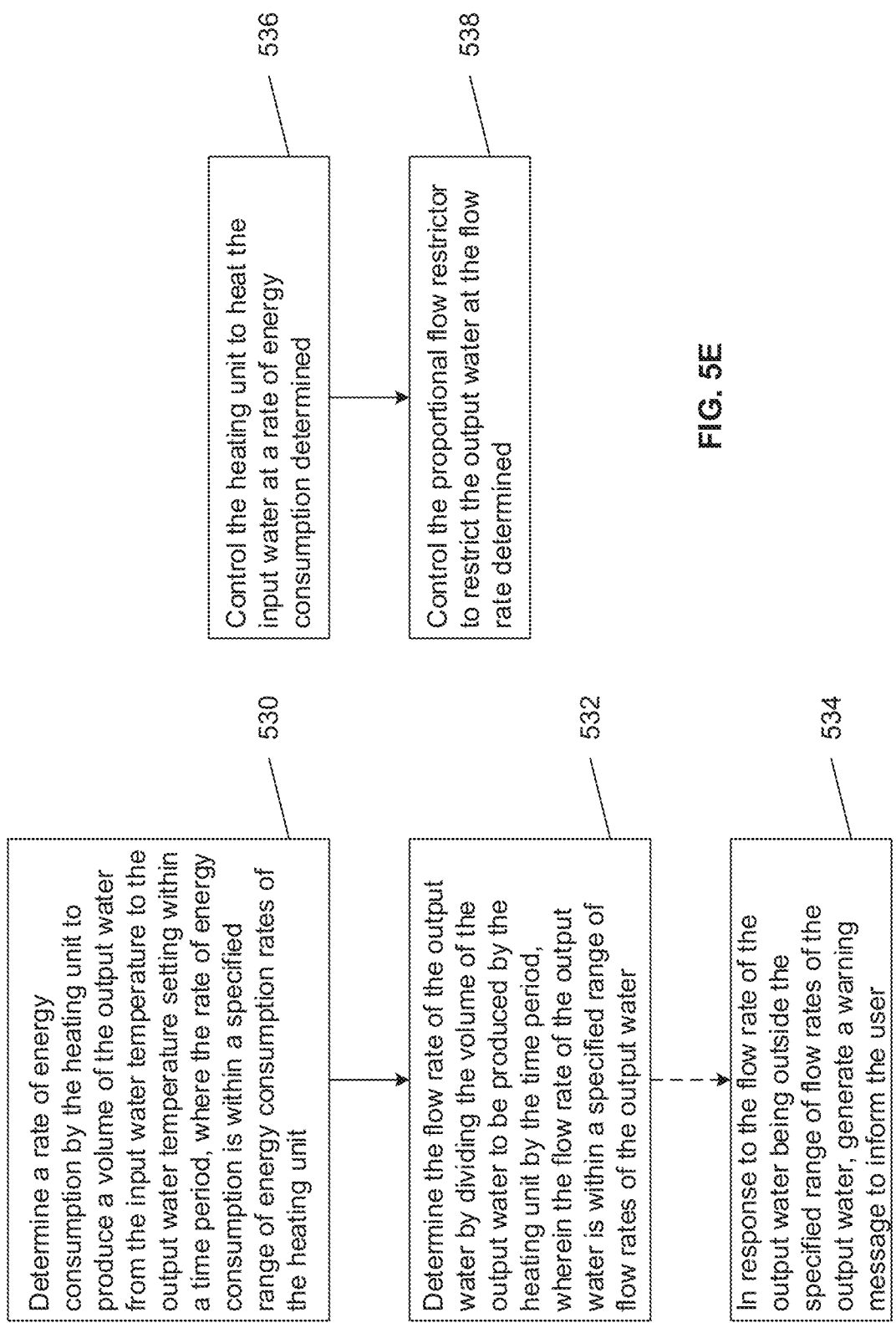

ENERGY EFFICIENT WATER HEATER

CROSS REFERENCE TO RELATED APPLICATION

This application is a continuation of U.S. non-provisional patent application Ser. No. 16/105,273, "Energy Efficient Water Heater," filed Aug. 20, 2018; which is assigned to the assignee hereof. The aforementioned United States patent application is hereby incorporated by reference in its entirety.

FIELD OF THE INVENTION

The present invention relates to the field of water heater manufacturing and applications. In particular, the present invention relates to apparatuses of an energy efficient water heater and methods for controlling the same.

BACKGROUND

Conventional water heaters, especially conventional tankless water heaters, face challenges in producing a consistent flow of hot output water when the input water temperature varies. While the average water supply temperature for a home can be between 55 to 65 degrees Fahrenheit (° F.), depending upon location. In some locations, water supply can be much colder as its holding tanks are exposed to ambient temperatures, which can be below freezing. In addition, conventional water heaters typically produce output water with temperatures around 130° F. to 140° F. A user typically obtains desired water temperature by adding cold water to the hot water at the dispensing fixture. There are numerous drawbacks associated with the conventional water heaters. First, it fails to maintain a desired output water temperature in certain situations. Second, it causes the user to waste water and fuel when mixing the cold water with the hot water to obtain a desired output water temperature.

Therefore, there is a need for addressing the issues of the conventional water heaters described above. Specifically, there is a need for an energy efficient water heater and methods for controlling the same.

SUMMARY

Apparatuses of an energy efficient water heater and methods for controlling the same are disclosed. In one embodiment, a water heater may include a water inlet configured to receive input water, an input water temperature sensor configured to detect a temperature of the input water, a user interface unit configured to receive an output water temperature setting selected by a user, a controller configured to determine a flow rate of an output water based on the input water temperature and the output water temperature setting, a heating unit configured to heat the input water to produce the output water, the controller is further configured to control the heating unit and a proportional flow restrictor to produce the flow rate of the output water, and a water outlet configured to transfer the output water at the flow rate of the output water, where the water heater further includes at least one of: a propane sensor configured to detect a propane level being over a propane level threshold and produce a first alert to the user; or a carbon monoxide sensor configured to detect a carbon monoxide level being over a carbon monoxide threshold and produce a second alert to the user.

In another embodiment, a method for controlling a heater may include receiving, by a water inlet, input water; detecting, by an input water temperature sensor, a temperature of the input water; receiving, by a user interface unit, an output water temperature setting selected by a user; determining, by a controller, a flow rate of an output water based on the input water temperature and the output water temperature setting; heating, by a heating unit, the input water to produce the output water; controlling, by the controller, the heating unit and a proportional flow restrictor to produce the flow rate of the output water; and transferring, by a water outlet, the output water at the flow rate, where controlling the water heater further includes at least one of: detecting, by a propane sensor, a propane level being over a propane level threshold and produce a first alert to the user; or detecting, by a carbon monoxide sensor, a carbon monoxide level being over a carbon monoxide threshold and produce a second alert to the user.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings. Like numbers are used throughout the drawings.

FIG. 5B illustrates an exemplary implementation of safety sensors in a water heater according to aspects of the present disclosure.

FIG. 5C illustrates another exemplary implementation of safety sensors in a water heater according to aspects of the present disclosure.

FIG. 5D illustrates an exemplary implementation of determining a flow rate of output water according to aspects of the present disclosure.

FIG. 5E illustrates an exemplary implementation of controlling a water heater according to aspects of the present disclosure.

DESCRIPTION OF EMBODIMENTS

Apparatuses of an energy efficient water heater and methods for controlling the same are disclosed. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
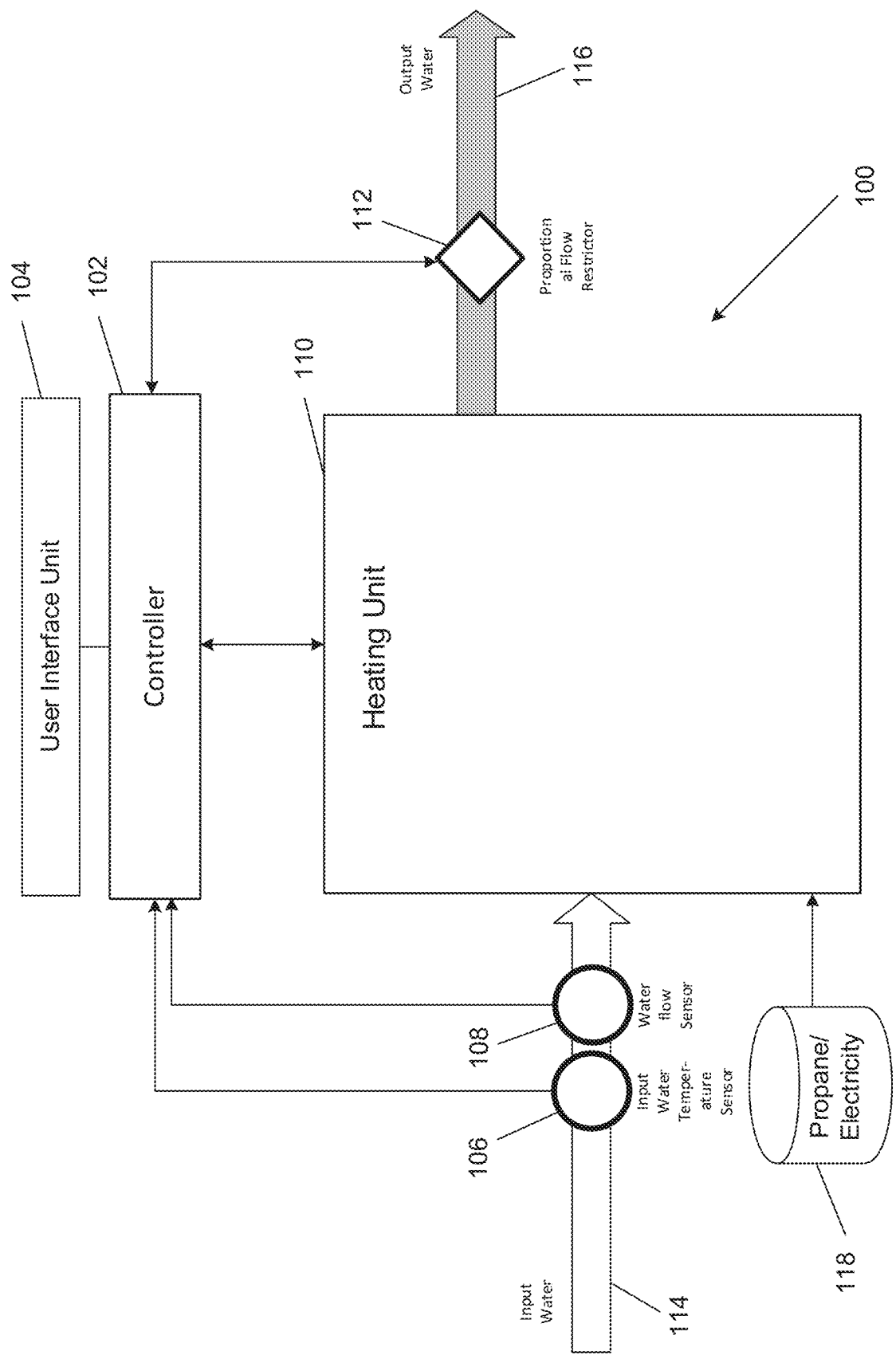
FIG. 1A illustrates an exemplary embodiment of a water heater according to aspects of the present disclosure.

FIG. 1A illustrates an exemplary embodiment of a water heater according to aspects of the present disclosure. In the example shown in FIG. 1A, a water heater 100 includes a controller 102 configured to communicate with a user interface unit 104, which is configured to collect inputs from a user, such as an output water temperature preference of the user. The controller 102 is further configured to receive sensor inputs from an input water temperature sensor 106 and a water flow sensor 108 through an input water inlet 114. Using the sensor data collected from the input water temperature sensor 106 and the water flow sensor 108, the controller can be configured to control a heating unit 110 and a proportional flow restrictor 112 of the water heater 100 to control the temperature and flow rate of an output water through a water outlet 116. The heater unit 110 can be configured to receive either propane or electricity 118 as an energy source for heating the input water to produce the output water.

According to aspects of the present disclosure, the proportional flow restrictor 112 can be controlled to restrict the flow of water through the unit when the input water temperature is too cold for the water heater to reach the output water temperature setting selected by the user. In recreational vehicle (RV) applications, the water supply for an RV can often be the RV's holding tanks at ambient temperature, which can approach freezing temperature. In these cases, once the burner reaches maximum propane burn rate, if a greater temperature increase is needed, the proportional flow restrictor 112 restricts water flow to reach proper temperature. In typical applications, a flow rate of about 3.5 gallons per minute can be maintained to produce output water at 120 F from room temperature water. In an extreme application, a flow rate of about 1.1 gallons per minute can be maintained to produce output water at 120 F from an input water of 35 F. Even at the lower flow rate of 1.1 gallons per minute, this flow rate may not be noticeable with most shower heads used in RVs, which are designed to conserve water even more than the comparable low-flow showerheads used in residences.

Figure 1B:
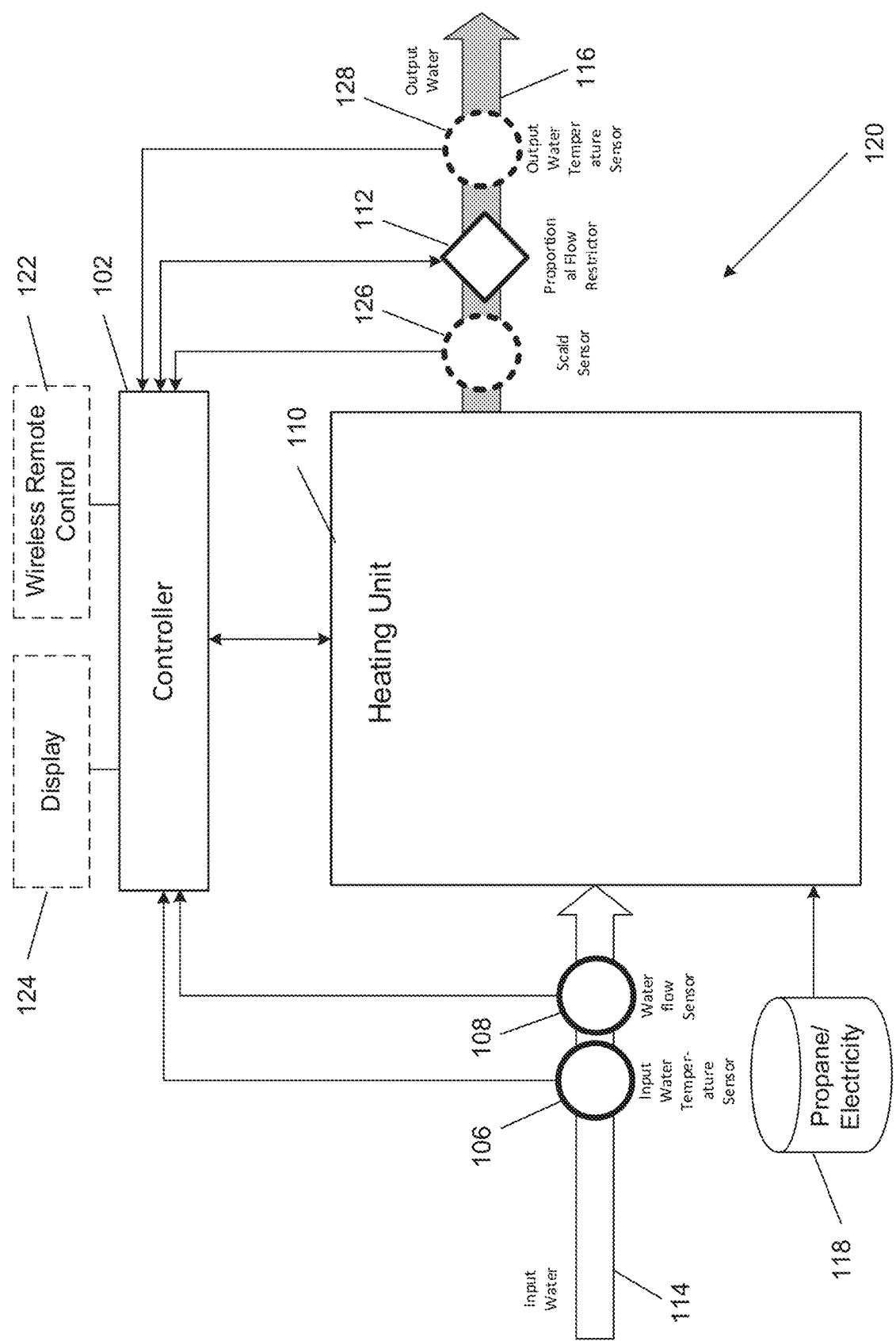
FIG. 1B illustrates another exemplary embodiment of a water heater according to aspects of the present disclosure.

FIG. 1B illustrates another exemplary embodiment of a water heater according to aspects of the present disclosure. Note that some of the components shown in FIG. 1B are similar to the corresponding components shown in FIG. 1A, and the descriptions of these components are skipped herein for simplicity. In addition to the components described in FIG. 1A, a user interface unit of water heater 120 may include a wireless remote control 122 and a display 124. The water heater 120 may further include a scald sensor 126 and an output water temperature sensor 128.

In some implementations, the wireless remote control 122 can be configured to adjust the desired temperature of the output water, and it may include a display configured to provide information about the settings of the water heater 120 to the user. With such implementations, the display 124 may be an optional feature of the water heater 120. The wireless remote control 122 may communicate with the controller 102 via Bluetooth, and it can be individually paired to its water heater to eliminate interference with other RVs located nearby. The wireless remote control 122 is waterproof and has magnets on the back, so it can stick to a self-adhesive metal plate.

According to aspects of the present disclosure, instead of heating the input water, regardless of its temperature, to the typical temperature of 130 F to 140 F of tanked water heaters, the disclosed efficient water heater can enable the user to set a desired shower temperature, which for most people is in the 105 F range. Thus, rather than turning on the 130-140 F hot water and then hunting for a comfortable temperature with the addition of cold water, which wastes both water and fuel in the process, a user may dial in the user's desired output water temperature, and the water heater can then produce the output water at the desired temperature. In some other implementations, the user may set the maximum output water temperature to 120 F and add cold water to reach a desired output water temperature, for example 108 F. In such cases, the user would still have conserved some energy by not heating the water to 130-140 F and by adding less cold water to reach the desired 108 F.

In situations where there are multiple users, the efficient water heater may be configured to store a preferred output water temperature for each of the users. For example, user A may set his output water temperature to 102 F; user B may set her output water temperature to 108 F; user C may set his output water temperature to 106 F, etc. Prior to using the water heater, each user may press a button on the wireless remote control 122 to command the water heater to produce the preset output water temperature for that particular user.

The display 124 may include a liquid crystal display or organic light emitting diode (OLED) display. The display 124 may be implemented as a touch sensor display and be configured to receive inputs of temperature or other settings from user without the remote control 122.

According to aspects of the present disclosure, the output water temperature sensor 128 is configured to detect the temperature of the output water and this detected output water temperature is transmitted to the controller 102 for safe-guarding the user from being burnt accidentally by high temperature output water.

Similarly, in conjunction with an optional pressure/temperature relief valve (described below), the scald sensor 126 is configured to detect sudden changes in temperature and pressure of the output water and sends the sensor signal to the controller 102 for safe-guarding the user from dangerous high temperature output water. In some implementations, since the output water temperature can be programmable and set to a maximum of 120 F, the disclosed water heater can be inherently scald-safe. In other words, the optional scald sensor 126 adds another level of safety to the water heater 120.

According to aspects of the present disclosure, the water heater 120 may optionally or additional include a pressure/temperature relief valve (not shown). In some implementations, similar to the pressure/temperature relief valve on the side of a residential water heater, the pressure/temperature relief valve releases water if it exceeds certain safe levels of temperature and/or pressure. The pressure/temperature relief valve is primarily used to prevent a tank explosion, which serves to satisfy the ANSI standards for instant water heaters. Note that for some implementations that do not use a tank, such implementations are inherently safe from explosion.

Figure 2A:
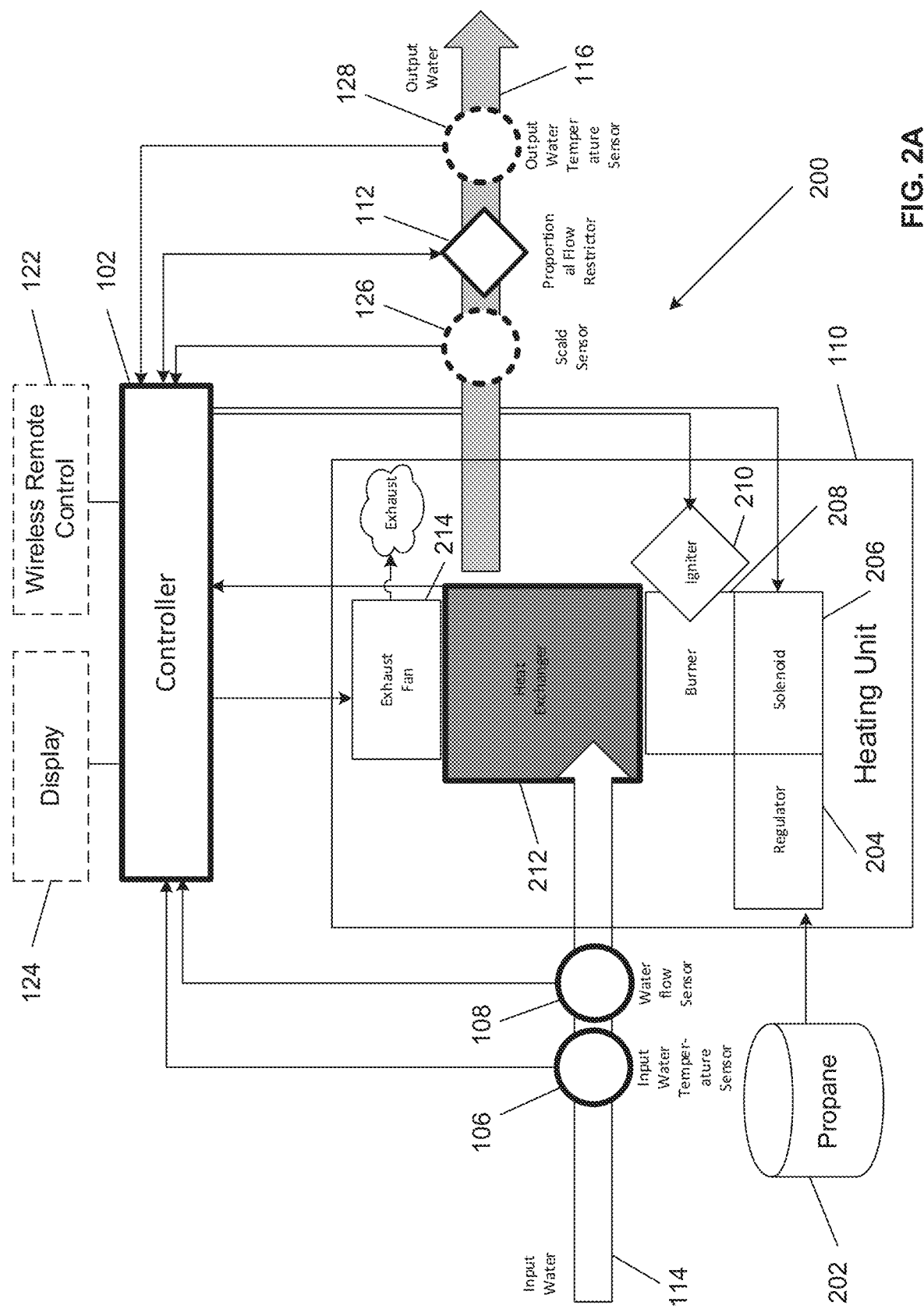
FIG. 2A illustrates yet another exemplary embodiment of a water heater according to aspects of the present disclosure.

FIG. 2A illustrates yet another exemplary embodiment of a water heater according to aspects of the present disclosure. Note that some of the components shown in FIG. 2A are similar to the corresponding components shown in FIG. 1B, and the descriptions of these components are skipped herein for simplicity. In the example shown in FIG. 2A, the heating unit 110 of the water heater 200 may be configured to consume propane fuel 202 as an energy source. The heating unit 110 may include a propane regulator/modulator 204, a solenoid 206, a burner 208, an igniter 210, heat exchanger 212, and exhaust fan 214. In some implementations, the propane fuel 202 can be 20-40 pound propane cylinders. In RV applications, they are typically mounted outside the RV, usually near the hitch or in the basement of motorhomes.

According to aspects of the present disclosure, the propane regulator/modulator 204 can be configured to regulate the pressure from the liquid propane tank into a pressure level appropriate for the burner 208. The controller 102 modulates flow of the propane fuel to produce a target output water temperature. As the input water temperature varies, flow of the propane fuel can be adjusted accordingly to maintain the output water temperature setting selected by the user. In the event a specified flow rate cannot be maintained, the controller 102 can generate an alert to inform the user.

The solenoid 206 is configured to enable the flow of the propane fuel to the burner 208; it is also configured to cut off the flow of the propane fuel when the water supply/demand terminates or when it is commanded by the controller 102 to shut down due to an error situation.

The burner 208 is configured to distribute the propane gas into multiple orifices to mix with air to heat the input water.

The igniter 210 can be an electrostatic igniter to ignite the burner 208 upon receiving a command from the controller 102. Many conventional water heaters use a pilot light instead. The conventional pilot light has at least three drawbacks. First, it burns propane fuel at all times, besides wasting fuel, it also presents a fire hazard. Second, the pilot light can be blown out on windy days, and it must be manually lit. Third, in RV applications, the propane fuel supply must be shut off while the RV is moving, thus the pilot light must be lit again whenever the RV is parked for use.

The heat exchanger 212 is configured to transfer heat energy from the burner 208 to the heat energy in the output water of the heater.

The exhaust fan 214 is configured to pull exhaust gases, such as carbon monoxide and carbon dioxide, away from the heater 200 and away from the room or enclosed environment in most applications.

Figure 2B:
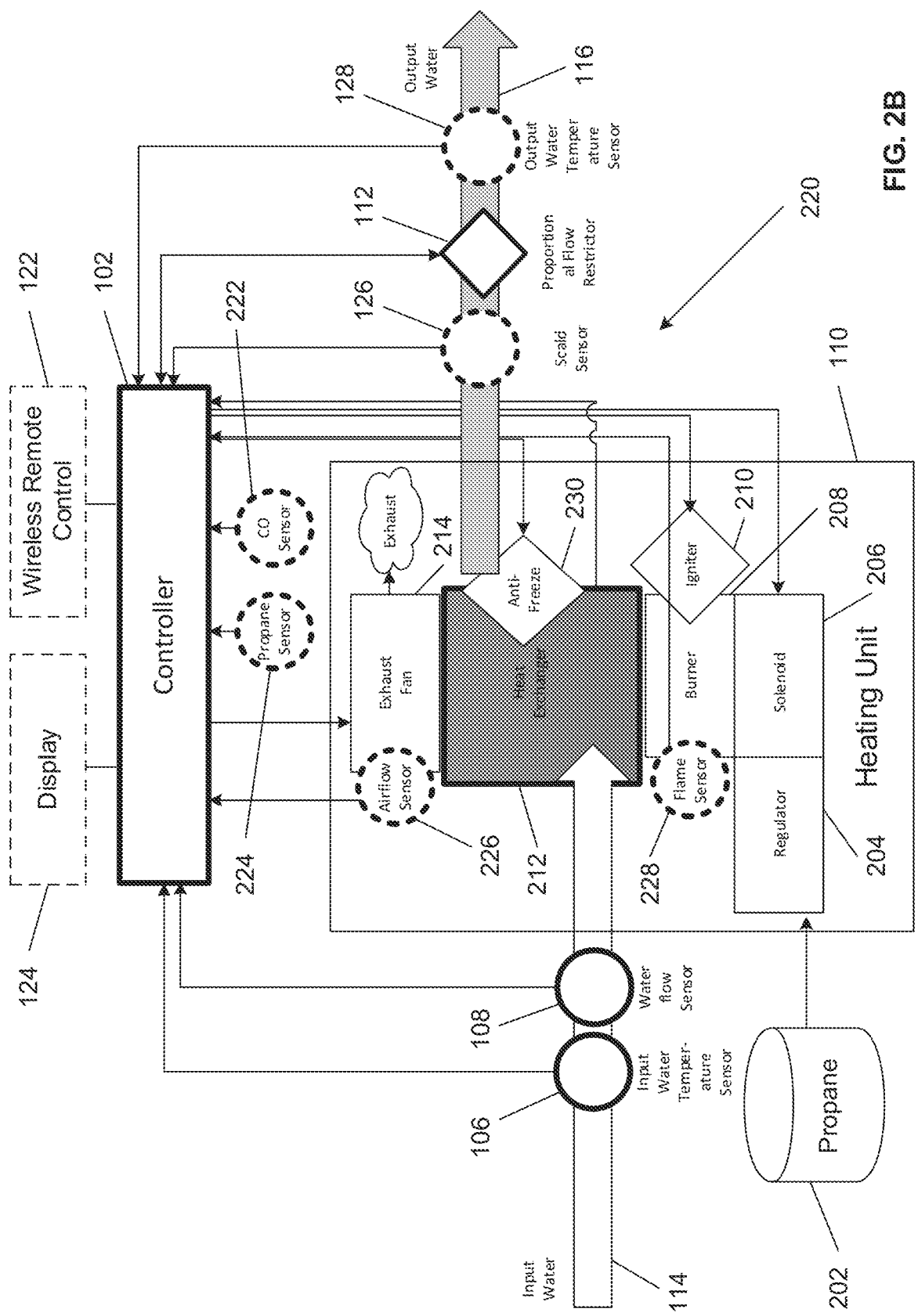
FIG. 2B illustrates yet another exemplary embodiment of a water heater according to aspects of the present disclosure.

FIG. 2B illustrates yet another exemplary embodiment of a water heater according to aspects of the present disclosure. Note that some of the components shown in FIG. 2B are similar to the corresponding components shown in FIG. 2A, and the descriptions of these components are skipped herein for simplicity. In the example shown in FIG. 2B, the water heater 220 may include a carbon monoxide sensor 222, a propane sensor 224, an airflow sensor 226, a flame sensor 228, and an anti-freeze sensor 230.

According to aspects of the present disclosure, the carbon monoxide (CO) sensor 222 and propane sensor 224 configured to detect whether a level of CO/propane exceed a safety threshold, and sends the information collected by the sensors to the controller 102. When an unsafe level of CO/propane is detected inside the water heater, the controller 102 can be configured to shuts down the unit and displays an error code on the display 124 as well as on the wireless remote control 122.

Although most residential or RVs have CO/propane detectors installed for the enclosed room or environment, however, such CO/propane detectors may be prone to have dead batteries, which render the CO/propane detectors ineffective. Thus, having the CO sensor 222 as a component of the water heater 220 can provide a faster alert than a CO/propane detector that covers the entire room or enclosed environment. Thus, it further enhances the safety of the users.

The flame sensor 228 is coupled to the burner 208 and is configured to detect whether the burner 208 is operating or not. After a certain amount of time without flame, upon receiving this sensor data, the controller 102 can command the solenoid 206 to shut down the flow of propane fuel to the burner 208.

The anti-freeze sensor 230 is coupled to the heat exchanger 212, and it is configured to detect freezing conditions of the heat exchanger 212.

In some implementation, the water heater 220 may include a water leak detector (not shown). It is known that damages caused by water leaks are one of the most common warranty claims. In some cases, water leaks can cause catastrophic damages or even death.

Figure 3A:
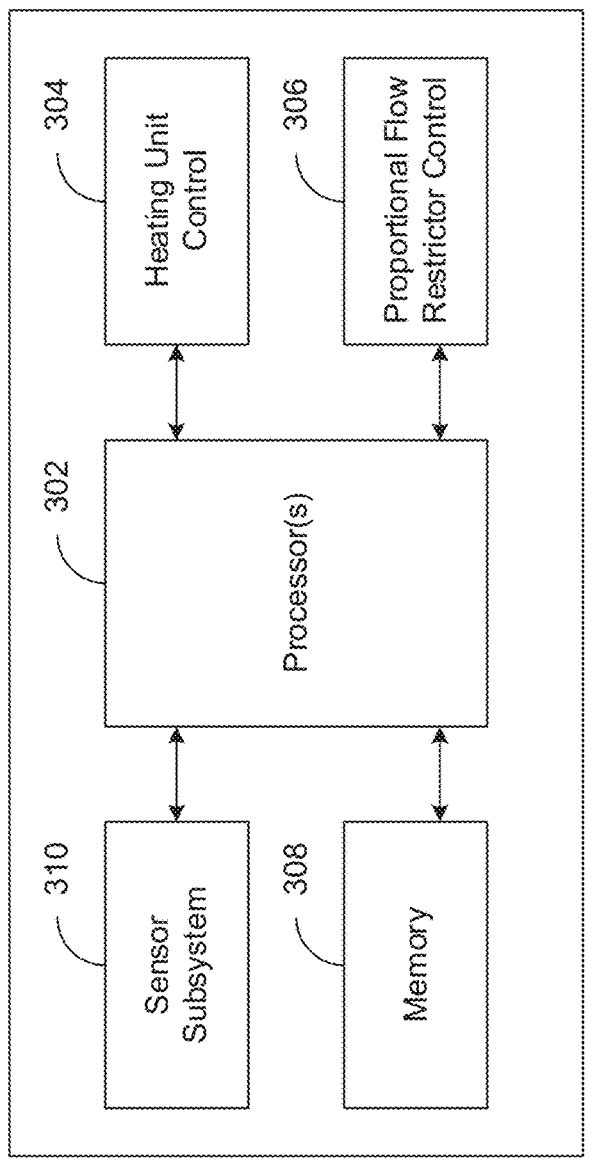
FIG. 3A illustrates an exemplary implementation of a water heater controller according to aspects of the present disclosure.

FIG. 3A illustrates an exemplary implementation of a water heater controller according to aspects of the present disclosure. In the example shown in FIG. 3A, a water heater controller may include one or more processor(s) 302, a heating unit control 304, a proportional flow restrictor control 306, a memory 308, and a sensor subsystem 310.

Figure 3B:
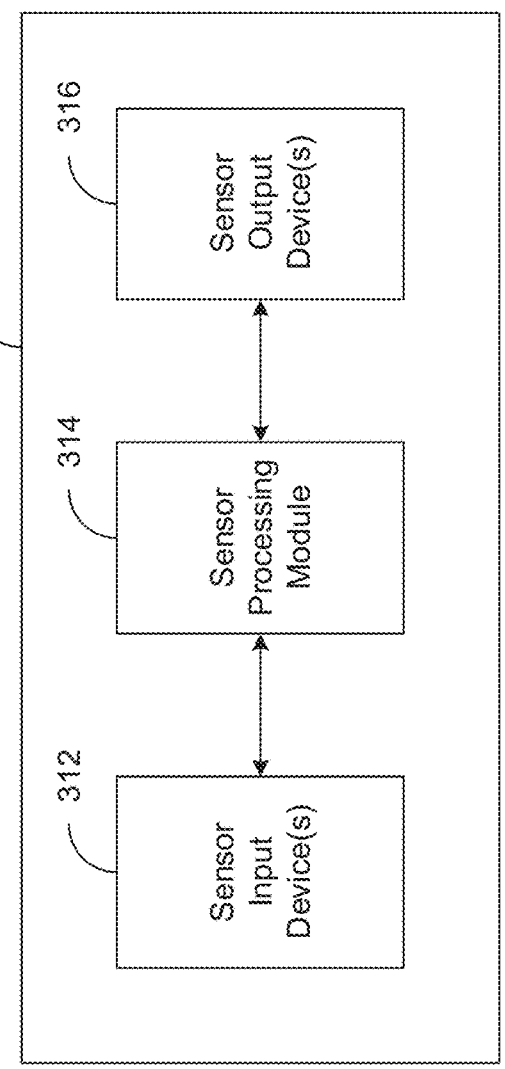
FIG. 3B illustrates an exemplary implementation of a sensor subsystem of FIG. 3A according to aspects of the present disclosure.

FIG. 3B illustrates an exemplary implementation of a sensor subsystem of FIG. 3A according to aspects of the present disclosure. As shown in FIG. 3B, the sensor subsystem 310 may include one or more sensor input devices 312, sensor processing module 314, and one or more sensor output devices 316. The one or more sensor input devices 312 may include but not limited to, one or more of input water temperature sensor, water flow sensor, scald sensor, output water temperature sensor, airflow sensor, flame sensor, propane sensor and CO sensor. The sensor processing module 314 may be configured to perform one or more of the following functions, including but not limited to: synchronization and timing control of input water supply, output water supply, and fuel supply. Along with the processor(s) 302, the one or more sensor output devices 316 may be configured to generate command signals to control the heating unit 110, the proportional flow restrictor 112, fuel supply control, input and output water flow control; output water temperature control.

Table 1 illustrates an exemplary set of experimental data showing relationships among input water temperatures, output water temperature and flow rates, and fuel consumption rates according to aspects of the present disclosure.

TABLE 1

| Input Water Temperature (in Fahrenheit) | Output Water Temperature at 105° F. and Flow Rates (in gallons per minute) | Propane Fuel Consumption Rates (in pounds per hour) |
|---|---|---|
| 32 | 1.32 | 2.80 |
| 42 | 1.53 | 2.80 |
| 51 | 1.80 | 2.80 |
| 60 | 2.11 | 2.75 |
| 70 | 2.64 | 2.67 |
| 75 | 2.64 | 2.29 |
| 85 | 2.64 | 1.52 |

Figure 4A:
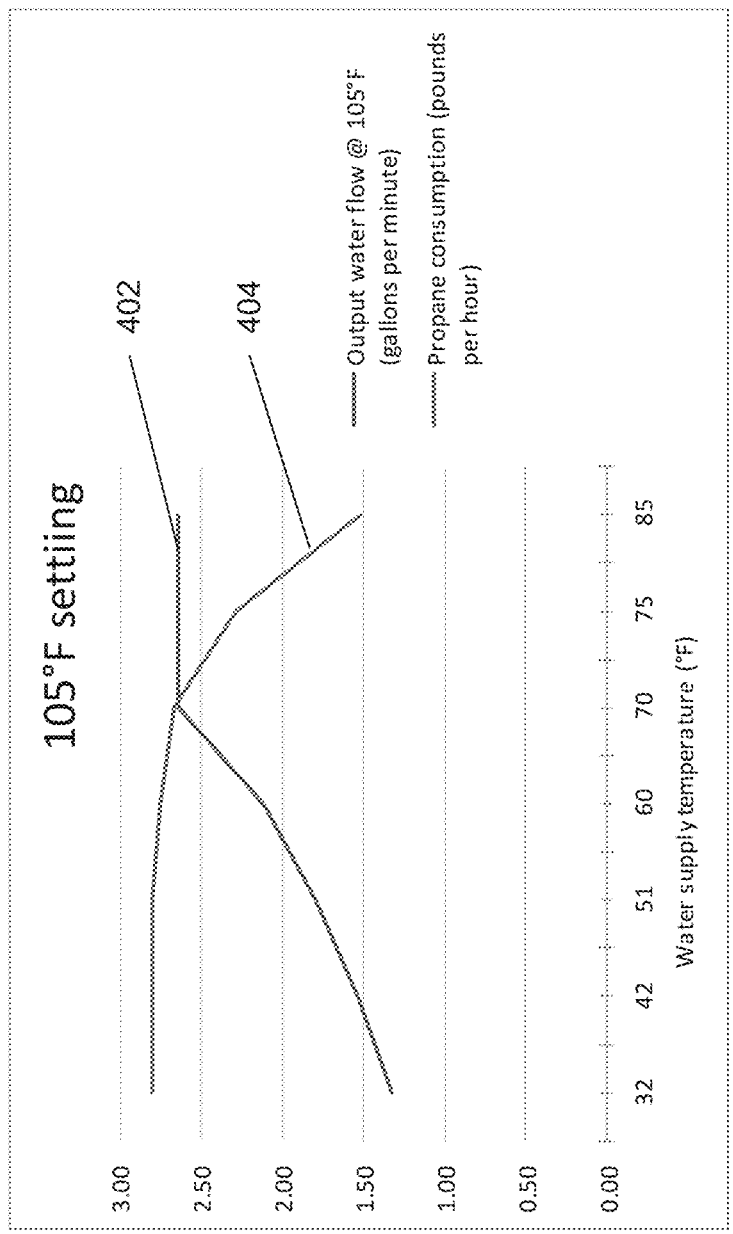
FIG. 4A illustrates an exemplary experimental data showing relationships among input water temperatures, output water temperature and flow rates, and fuel consumption rates according to aspects of the present disclosure.

FIG. 4A illustrates a corresponding graphical representation of Table 1. As shown in FIG. 4A, the vertical axis represents the output water flow rate (gallons per minute) at output water temperature 105° F. and/or the propane fuel consumption rate (pounds per hour). The horizontal axis represents the input water supply temperature (in ° F.). In this example, the curve 402 shows the changes in output water flow rates at 105° F. as the input water temperature increase from 32° F. to 85° F. Under the same environment, 404 shows the changes in the propane fuel consumption rates for producing the output water temperature at 105° F. as the input water temperature increase from 32° F. to 85° F.

Table 2 illustrates another set of exemplary experimental data showing relationships among input water temperatures, output water temperature and flow rates, and fuel consumption rates according to aspects of the present disclosure.

TABLE 2

| Input Water Temperature (in Fahrenheit) | Output Water Temperature at 120° F. and Flow Rates (in gallons per minute) | Propane Fuel Consumption Rates (in pounds per hour) |
|---|---|---|
| 32 | 1.10 | 2.80 |
| 39 | 1.19 | 2.80 |
| 48 | 1.32 | 2.80 |
| 57 | 1.53 | 2.80 |
| 66 | 1.80 | 2.80 |
| 75 | 2.11 | 2.75 |
| 85 | 2.64 | 2.70 |

Figure 4B:
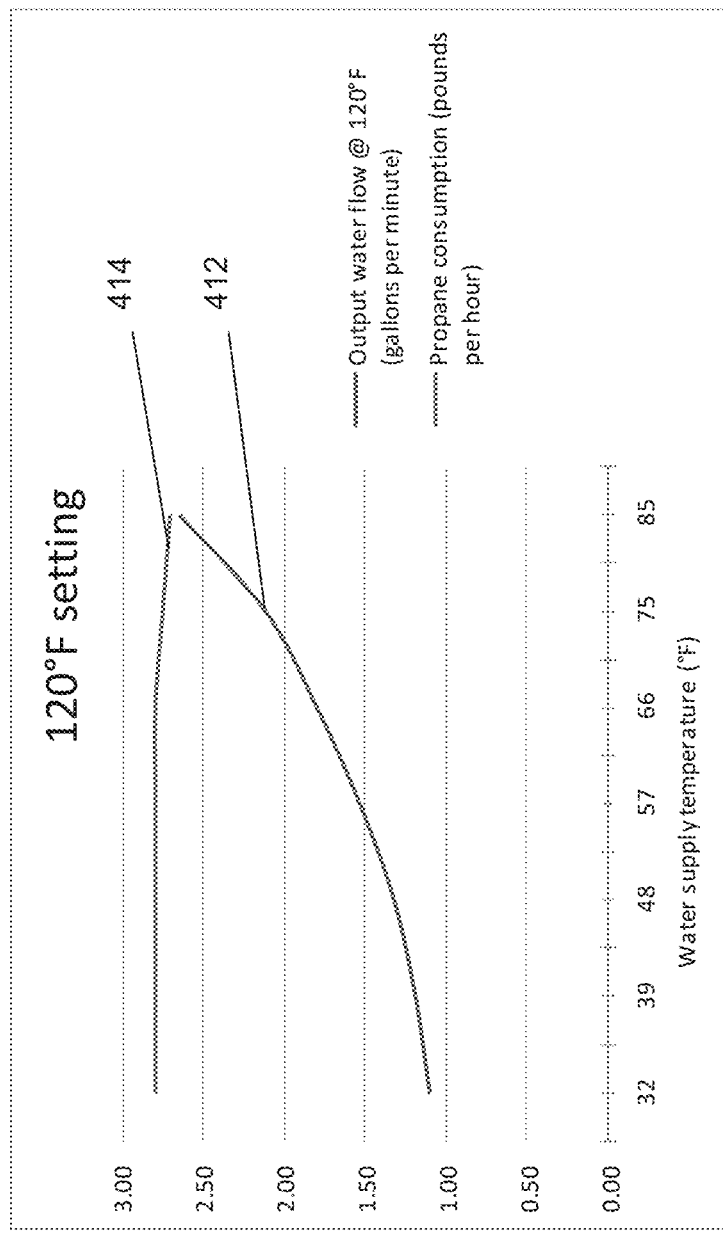
FIG. 4B illustrates another exemplary experimental data showing relationships among input water temperatures, output water temperature and flow rates, and fuel consumption rates according to aspects of the present disclosure.

FIG. 4B illustrates a corresponding graphical representation of Table 2. As shown in FIG. 4B, the vertical axis represents the output water flow rate (gallons per minute) at output water temperature 120° F. and/or the propane fuel consumption rate (pounds per hour). The horizontal axis represents the input water supply temperature (in ° F.). In this example, the curve 412 shows the changes in output water flow rates at 120° F. as the input water temperature increase from 32° F. to 85° F. Under the same environment, 414 shows the changes in the propane fuel consumption rates for producing the output water temperature at 120° F. as the input water temperature increase from 32° F. to 85° F.

Figure 5A:
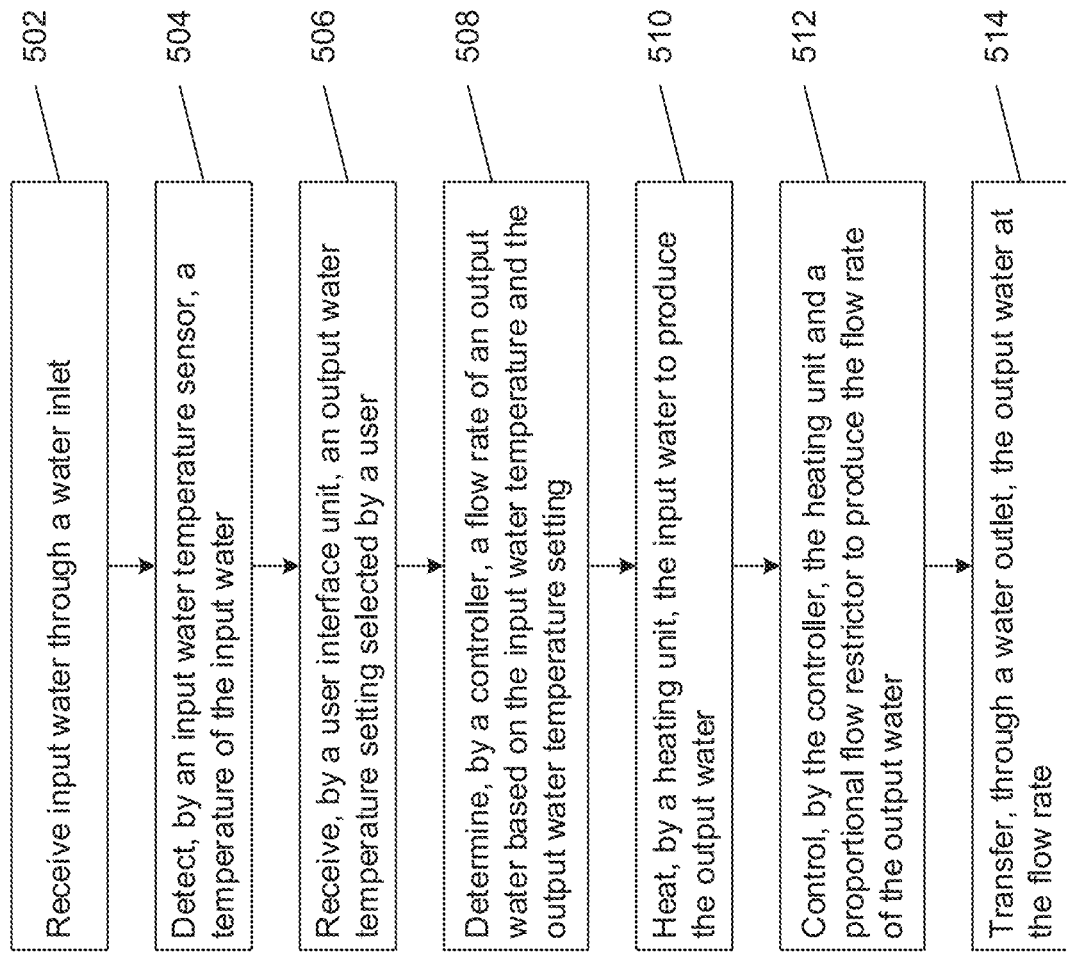
FIG. 5A illustrates an exemplary method of controlling a water heater according to aspects of the present disclosure.

FIG. 5A illustrates an exemplary method of controlling a water heater according to aspects of the present disclosure. In the example shown in FIG. 5A, in block 502, the method receives input water through a water inlet. In block 504, the method detects, by an input water temperature sensor, a temperature of the input water. In block 506, the method receives, by a user interface unit, an output water temperature setting selected by a user. In block 508, the method determines, by a controller, a flow rate of an output water based on the input water temperature and the output water temperature setting. In block 510, the method heats, by a heating unit, the input water to produce the output water. In block 512, the method controls, by the controller, the heating unit and a proportional flow restrictor to produce the flow rate of the output water. In block 514, the method transfers, through a water outlet, the output water at the flow rate.

FIG. 5B illustrates an exemplary implementation of safety sensors in a water heater according to aspects of the present disclosure. As shown in FIG. 5B, in block 520, the method detects, by a scald sensor, a sudden change in water pressure of the input water. In block 522, the method detects, by an output water temperature sensor; a temperature of the output water. In block 524, the method alerts, by the scald sensor and the output water temperature sensor, the controller to shutoff the output water in response to the temperature of the output water exceeds a threshold temperature.

FIG. 5C illustrates another exemplary implementation of safety sensors in a water heater according to aspects of the present disclosure. In some implementations, either or both a propane sensor or a carbon monoxide sensor may be installed in the water heater. In other words, either or both the methods performed in block 526 and in block 528 may be performed in such implementations. In block 526, the method detects, by a propane sensor, a propane level being over a propane level threshold and produce a first alert to the user. In block 526, the method detects, by a carbon monoxide sensor, a carbon monoxide level being over a carbon monoxide threshold and produce a second alert to the user.

FIG. 5D illustrates an exemplary implementation of determining a flow rate of output water according to aspects of the present disclosure. In the example shown in FIG. 5D, in block 530, the method determines a rate of energy consumption by the heating unit to produce a volume of the output water from the input water temperature to the output water temperature setting within a time period, where the rate of energy consumption is within a specified range of energy consumption rates of the heating unit. In block 532, the method determines the flow rate of the output water by dividing the volume of the output water to be produced by the heating unit by the time period, wherein the flow rate of the output water is within a specified range of flow rates of the output water. According to aspects of the present disclosure, the method performed in block 532 may optionally or additionally include the method performed in block 534. In block 534, in response to the flow rate of the output water being outside the specified range of flow rates of the output water, the method generates a warning message to inform the user.

FIG. 5E illustrates an exemplary implementation of controlling a water heater according to aspects of the present disclosure. As shown in FIG. 5E, in block 536, the method controls the heating unit to heat the input water at a rate of energy consumption determined. In block 538, the method controls the proportional flow restrictor to restrict the output water at the flow rate determined.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A water heater, comprising:
   a water inlet configured to receive input water;
   an input water temperature sensor configured to detect a temperature of the input water;
   a user interface unit configured to receive an output water temperature setting selected by a user;
   a controller configured to determine a flow rate of an output water based on the input water temperature and the output water temperature setting;
   a heating unit configured to heat the input water to produce the output water;
   the controller is further configured to control the heating unit and a proportional flow restrictor to produce the flow rate of the output water; comprising control the heating unit to heat the input water at a rate of energy consumption determined, and control the proportional flow restrictor to restrict the output water at the flow rate determined; and
   a water outlet configured to transfer the output water at the flow rate;
   wherein the water heater further comprises at least one of:
   a propane sensor configured to detect a propane level being over a propane level threshold and produce a first alert to the user;
   or a carbon monoxide sensor configured to detect a carbon monoxide level being over a carbon monoxide threshold and produce a second alert to the user.

2. The water heater of claim 1, further comprising:
   a scald sensor configured to detect a sudden change in water pressure of the input water; and
   an output water temperature sensor configured to detect a temperature of the output water;
   wherein the scald sensor and the output water temperature sensor are configured to alert the controller to shutoff the output water in response to the temperature of the output water exceeds a threshold temperature.

3. The water heater of claim 1, wherein the user interface unit includes at least a touch sensor display or a wireless remote control configured to allow the user to select the temperature setting of the output water.

4. The water heater of claim 1, wherein the heating unit comprises:
   a burner configured to distribute a propane fuel into multiple orifices to mix with air for heating the input water;
   a regulator configured to regulate the pressure from the liquid propane tank into a pressure level for the burner;
   a solenoid configured to enable the flow of the propane fuel to the burner;
   an igniter configured to electrically ignite the burner;
   a heat exchanger configured to transfer heat energy from the burner to the output water; and
   an exhaust fan configured to push exhaust gases out of an enclosed environment of the water heater.

5. The water heater of claim 4, wherein the heating unit further comprises at least one of:
   a flame sensor coupled to the burner, wherein the flame sensor is configured to detect whether the burner is operating or not;

an airflow sensor coupled to the exhaust fan, wherein the exhaust fan is configured to detect a rate of exhaust flow being above an exhaust flow threshold; or an anti-freeze sensor coupled to the heat exchanger, wherein the anti-freeze sensor is configured to detect freezing conditions of the heating exchanger.

6. The water heater of claim 1, wherein the controller comprises:

a sensor subsystem configured to sense operating conditions and produce control commands to control operations of the water heater;

a heating unit control configured to heat the input water to produce the output water;

a proportional flow restrictor control configured to control the flow rate of the output water; and a memory configured to store user data, sensor data and operating data of the water heater; and one or more processor(s), together with the sensor subsystem, the heating unit control, the proportional flow restrictor and the memory, configured to control the operations of the water heater.

7. The water heater of claim 1, wherein the controller is further configured to:

determine a rate of energy consumption by the heating unit to produce a volume of the output water from the input water temperature to the output water temperature setting within a time period, wherein the rate of energy consumption is within a specified range of energy consumption rates of the heating unit; and determine the flow rate of the output water by dividing the volume of the output water to be produced by the heating unit by the time period, wherein the flow rate of the output water is within a specified range of flow rates of the output water.

8. The water heater of claim 7, wherein the controller is further configured to:

in response to the flow rate of the output water being outside the specified range of flow rates of the output water, generate a warning message to inform the user.

9. A method for controlling a water heater, comprising:

receiving, through a water inlet, input water;

detecting, by an input water temperature sensor, a temperature of the input water;

receiving, by a user interface unit, an output water temperature setting selected by a user;

determining, by a controller, a flow rate of an output water based on the input water temperature and the output water temperature setting;

heating, by a heating unit, the input water to produce the output water;

controlling, by the controller, the heating unit and a proportional flow restrictor to produce the flow rate of the output water; comprising controlling the heating unit to heat the input water at a rate of energy consumption determined, and controlling the proportional flow restrictor to restrict the output water at the flow rate determined; and transferring, through a water outlet, the output water at the flow rate;

wherein controlling the water heater further comprises at least one of: detecting, by a propane sensor, a propane level being over a propane level threshold and produce a first alert to the user; or detecting, by a carbon monoxide sensor, a carbon monoxide level being over a carbon monoxide threshold and produce a second alert to the user.

10. The method of claim 9, further comprising:

detecting, by a scald sensor, a sudden change in water pressure of the input water;

detecting, by an output water temperature sensor; a temperature of the output water; and alerting, by the scald sensor and the output water temperature sensor, the controller to shutoff the output water in response to the temperature of the output water exceeds a threshold temperature.

11. The method of claim 9, wherein the user interface unit includes at least a touch sensor display or a wireless remote control configured to allow the user to select the temperature setting of the output water.

12. The method of claim 9, wherein the heating unit comprises:

a burner configured to distribute a propane fuel into multiple orifices to mix with air for heating the input water;

a regulator configured to regulate the pressure from the liquid propane tank into a pressure level for the burner;

a solenoid configured to enable the flow of the propane fuel to the burner;

an igniter configured to electrically ignite the burner;

a heat exchanger configured to transfer heat energy from the burner to the output water; and an exhaust fan configured to push exhaust gases out of an enclosed environment of the water heater.

13. The method of claim 12, wherein the heating unit further comprises at least one of:

a flame sensor coupled to the burner, wherein the flame sensor is configured to detect whether the burner is operating or not;

an airflow sensor coupled to the exhaust fan, wherein the exhaust fan is configured to detect a rate of exhaust flow being above an exhaust flow threshold; or an anti-freeze sensor coupled to the heat exchanger, wherein the anti-freeze sensor is configured to detect freezing conditions of the heating exchanger.

14. The method of claim 9, wherein the controller comprises:

a sensor subsystem configured to sense operating conditions and produce control commands to control operations of the water heater;

a heating unit control configured to heat the input water to produce the output water;

a proportional flow restrictor control configured to control the flow rate of the output water; and a memory configured to store user data, sensor data and operating data of the water heater; and one or more processor(s), together with the sensor subsystem, the heating unit control, the proportional flow restrictor and the memory, configured to control the operations of the water heater.

15. The method of claim 9, wherein determining the flow rate of the output water based on the input water temperature and the output water temperature setting further comprises:

determining a rate of energy consumption by the heating unit to produce a volume of the output water from the input water temperature to the output water temperature setting within a time period, wherein the rate of energy consumption is within a specified range of energy consumption rates of the heating unit; and determining the flow rate of the output water by dividing the volume of the output water to be produced by the heating unit by the time period, wherein the flow rate of the output water is within a specified range of flow rates of the output water.

16. The method of claim 15, further comprising:
   in response to the flow rate of the output water being outside the specified range of flow rates of the output water, generating a warning message to inform the user.

* * * * *